United States Patent [19]

Ash et al.

[11] Patent Number: 4,624,731
[45] Date of Patent: Nov. 25, 1986

[54] VACUUM RING FOR PRODUCING LAMINATED GLASS

[75] Inventors: Charles E. Ash, Perrysburg; Scott W. Chambers, Millbury; David R. Jenkins, Maumee, all of Ohio; Siegfried H. Herliczek, Petersburg, Mich.

[73] Assignee: Libbey-Owens-Ford Company, Toledo, Ohio

[21] Appl. No.: 710,287

[22] Filed: Mar. 11, 1985

[51] Int. Cl.$^4$ .................. B32B 31/06; B32B 31/14
[52] U.S. Cl. ............................ 156/382; 156/87; 156/104; 156/285; 156/286
[58] Field of Search ............. 156/87, 104, 285, 286, 156/382

[56] References Cited

U.S. PATENT DOCUMENTS

| 1,870,284 | 8/1932 | Drake | 156/104 |
| 2,992,953 | 7/1961 | Talburtt | 156/382 |
| 3,281,296 | 10/1966 | Jameson | 156/104 |
| 3,933,552 | 1/1976 | Shumaker | 156/104 |

*Primary Examiner*—Caleb Weston
*Attorney, Agent, or Firm*—Marshall & Melhorn

[57] ABSTRACT

The present invention relates to a unique vacuum ring construction which can be utilized to de-air a laminated glass assembly while it is positioned within a pressurized and heated autoclave unit. The vacuum ring is constructed to minimize the amount of plastic material which can flow outwardly of the marginal edges of the glass sheet during the heating and pressurizing operation of the autoclave. The ring is provided with a channel formed therein for receiving the peripheral edge of the laminated assembly. In accordance with the present invention, at least a first length of the channel defines an inner surface having a cross-sectional configuration which generally conforms to the cross-sectional configuration defined by the outer edge surface of the laminated assembly when the ring is mounted on the laminated assembly and coupled to a vacuum source. At least a second length of the channel is provided with a recess which is positioned adjacent the juncture of the edges of the individual laminae when the ring is mounted on the laminated assembly. The recess is defined by a wall at least a portion of which is maintained in spaced apart relationship with the laminated assembly when the ring is coupled to the vacuum source.

13 Claims, 8 Drawing Figures

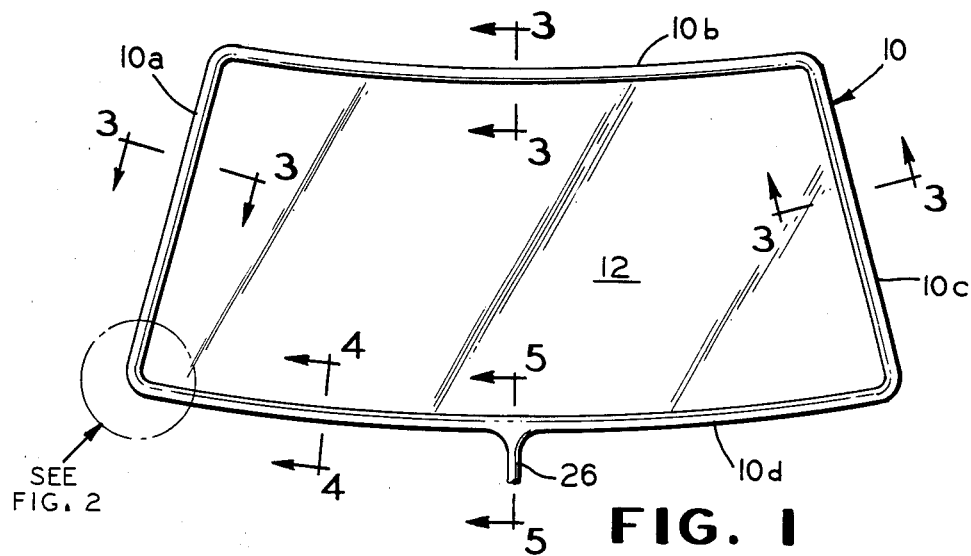
FIG. 1
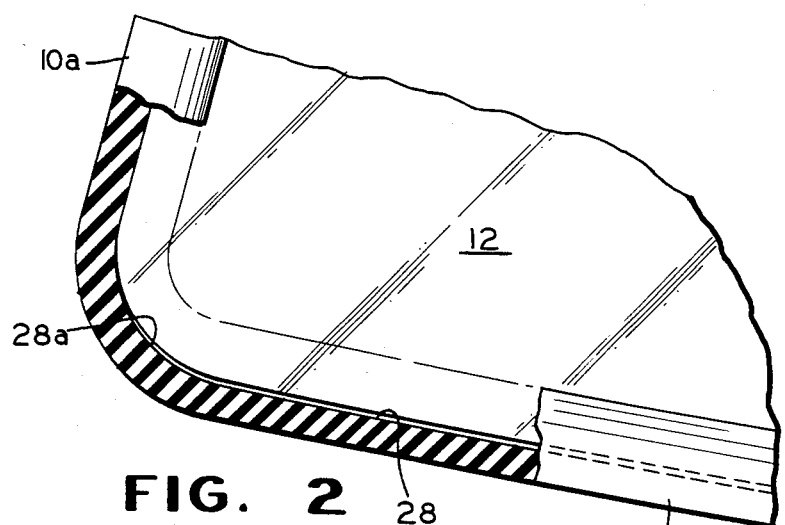
FIG. 2
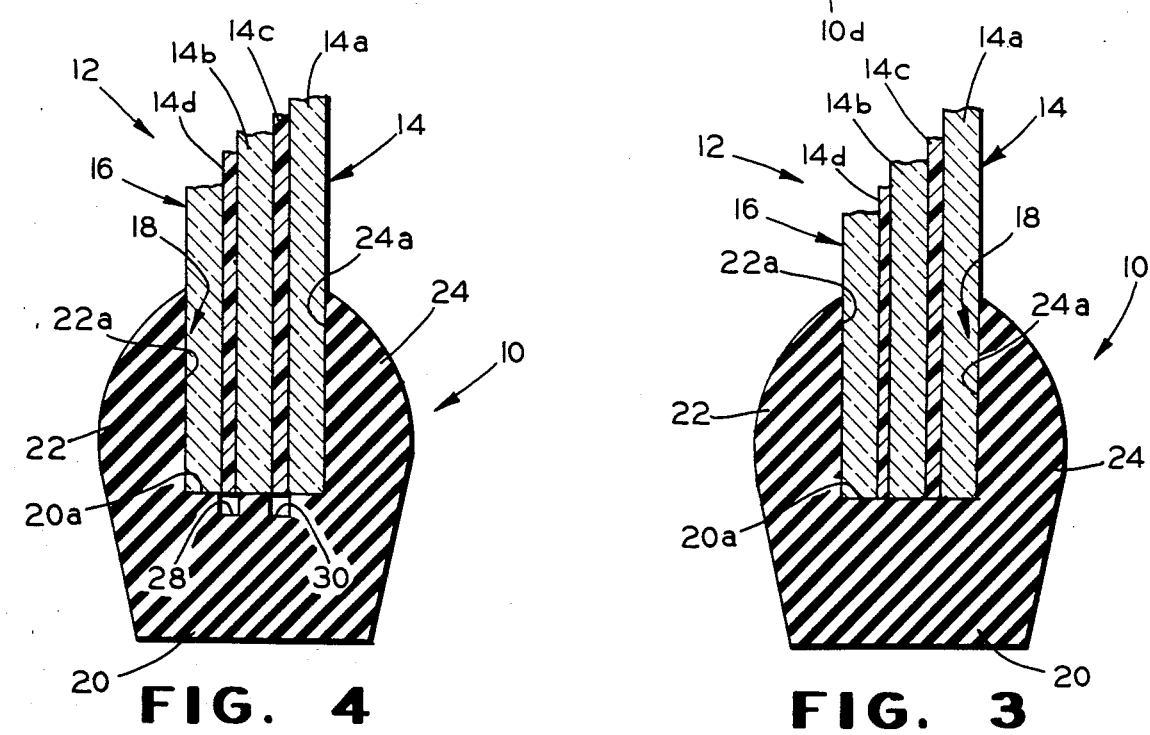
FIG. 4
FIG. 3

VACUUM RING FOR PRODUCING LAMINATED GLASS

BACKGROUND OF THE INVENTION

The present invention relates generally to a vacuum system utilized for evacuating the space between at least two laminae of a laminated assembly and, in particular, to a vacuum ring construction which is utilized for de-airing a laminated glass assembly such as an automobile windshield, for example.

In the early stages of the automobile industry, single sheets of ordinary glass were employed as windshields. As it became evident that this type of windshield presented a considerable safety hazard, the single sheets of ordinary glass were replaced with single sheets of heat treated or tempered glass. Thereafter, laminated safety glass was developed to further reduce the severity of lacerative injuries. The use of laminated glass assemblies in automobile windshields greatly increased until today, when almost all automotive windshields are constructed of some type of laminated glass.

Typically, a laminated glass assembly of the type utilized in vehicle windshields consists of two sheets of glass bonded together with a thin plastic interlayer, such as a sheet of polyvinyl butyral, for example. In the event of an impact on the laminated glass windshield sufficient to break the glass, the plastic interlayer functions to bind the glass fragments together, thus reducing the risk of injury to a driver or a passenger as a result of flying glass or contact with the windshield. Recently, it has been found that the addition of a second plastic layer applied to the inner surface of the windshield further increases the effectiveness of the laminated glass. This second plastic layer has been called an anti-laceration shield. Also, it has been found that single sheets of glass having an anti-lacerative plastic layer applied to the inner surface of the glass can effectively function as a windshield or other type of safety window.

One of the problems in manufacturing laminated glass assemblies of the type described above is related to the assembling and bonding techniques utilized to produce a windshield having high optical qualities. Once the individual laminae of the laminated assembly have been assembled in a stacked arrangement, the individual laminae are pressed toward one another while the entire assembly is heated to a predetermined temperature to cause the intermediate layers of plastic material to soften and bond to the adjacent glass sheets. Typically, such an operation is performed in an autoclave. The autoclave includes a heated and pressurized chamber for receiving the stacked arrangement of individual laminae. The heated chamber of the autoclave can be sealed and pressurized, causing the individual laminae to be urged toward one another, while the increased temperature causes the plastic laminae to soften and bond to the adjacent glass laminae.

Prior to placing the stacked arrangement of individual laminae in an autoclave it has been found desirable to "de-air" the assembly by evacuating air spaces which may be present between the individual laminae. One method of de-airing a laminated glass assembly is to place the entire stack of individual laminae in a plastic bag and thereafter evacuate the bag. Another approach is to utilize a vacuum ring of the type disclosed in U.S. Pat. Nos. 2,948,645 and 3,074,466. These patents disclose a vacuum ring which is constructed of a flexible material and is provided with a channel formed therein for receiving the entire peripheral edge of the laminated glass assembly. The channel of the vacuum ring includes a recessed portion which is maintained in a spaced apart relationship with the entire peripheral edge of the glass assembly. This recessed portion defines a passageway which is coupled to a vacuum source. When the vacuum ring is mounted about the peripheral edge of the glass sheet, and coupled to the vacuum source, the vacuum removes the majority of the air spaces between the laminae.

In some instances, it is desirable to maintain the vacuum ring about the laminated assembly when the assembly is positioned within an autoclave, and to apply a vacuum to the assembly during at least a portion of the time when the assembly is heated and pressurized by the autoclave. However, one of the problems with such an approach is that during such an operation, the softened plastic layers are typically forced outwardly past the marginal edges of the glass sheets and into the recessed portion of the vacuum ring. This tends to reduce the thickness of the plastic layers around the marginal edges of the glass, and consequently produces undesirable optical distortion in those areas.

SUMMARY OF THE INVENTION

The present invention relates to a unique vacuum ring construction which minimizes the distortion which can occur about the peripheral edges of the laminated assembly during the heating and pressurizing operation in the autoclave. The vacuum ring of the present invention is adapted to be coupled to a vacuum source and to be mounted about the peripheral edge of the laminated assembly. The ring is constructed of a flexible material and is provided with a channel formed therein for receiving the peripheral edge of the laminated assembly.

In accordance with the present invention, at least a first length of the channel defines an inner surface having a cross-sectional configuration which generally conforms to the cross-sectional configuration defined by the outer edge surface of the laminated assembly when the ring is mounted on the laminated assembly and coupled to the vacuum source. Thus, along this first length of the channel, the plastic inner layer is prevented from escaping past the marginal edges of the glass sheets. Also, at least a second length of the channel is provided with a recess which is positioned adjacent the juncture of the edges of the individual laminae when the ring is mounted on the assembly. The recess is defined by a wall having at least a portion of which is maintained in spaced apart relationship with the laminated assembly when the ring is coupled to the vacuum source. This provides a passageway which is coupled to the vacuum source and can be utilized to pull a vacuum along a second length of the channel, thereby de-airing the laminated glass assembly.

In the preferred embodiment of the invention, the recess has a width which is substantially the same as the thickness of the associated adjacent plastic sheet. In instances wherein more than one plastic sheet is to be bonded to the glass assembly, a second recess parallel to and spaced from the first recess can be provided along the second length of the channel to evacuate spaces between the second plastic sheet and the adjacent glass sheets.

It has been found that a vacuum ring having a construction of the present invention provides a very effective means for de-airing a laminated assembly while it is placed in a heated and pressurized autoclave. The vacuum ring enables the assembly to be de-aired while preventing the softened plastic interlayers from escaping along a first length of a peripheral edge of the laminated assembly, while simultaneously minimizing any escaping of the plastic layers along a second length of the assembly.

BRIEF DESCRIPTION OF THE DRAWINGS

The above, as well as other advantages of the present invention, will become readily apparent to one skilled in the art from reading the following detailed description of the invention in conjunction with the attached drawings in which:

FIG. 1 illustrates a plan view of a laminated glass assembly having a vacuum ring of the present invention mounted about the peripheral edge of the glass assembly;

FIG. 2 is an enlarged plan view, partially broken away, of the lower left hand portion of the assembly of FIG. 1;

FIG. 3 is a sectional view taken along the lines 3—3 of FIG. 1, and illustrating the portion of the channel of the vacuum ring having a cross-sectional configuration substantially conforming to the cross-sectional configuration of the outer edge of the laminated assembly;

FIG. 4 is a sectional view taken along the line 4—4 of FIG. 1, and illustrating the portion of the channel of the vacuum ring having recessed areas formed therein defining passageways which communicate with a vacuum source for de-airing the laminated assembly;

DESCRIPTION OF THE PREFERRED EMBODIMENT

Figure 5:
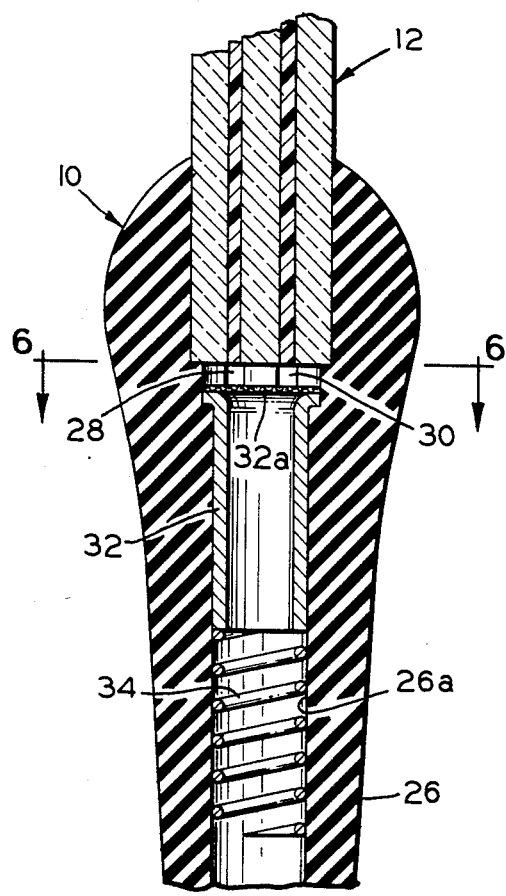
FIG. 5 is a sectional view taken along the line 5—5 of FIG. 1 and illustrating a screen barrier which prevents plastic from flowing into the associated vacuum line.
Figure 6:
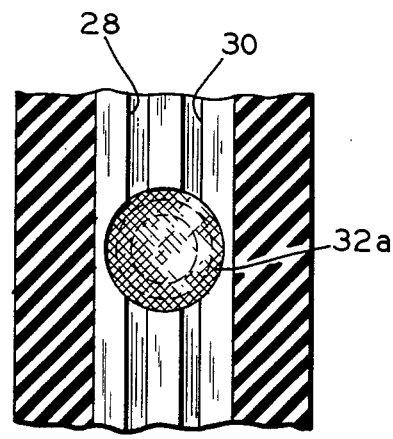
FIG. 6 is a sectional view taken along the line 6—6 of FIG. 5.

It should be noted at the outset of this description that, while the vacuum ring of the present invention is described for use in connection with producing a laminated glass assembly, it will be appreciated that the vacuum ring can be utilized in the manufacturing of other types of laminated assemblies. Referring to FIG. 1, there is shown a plan view of a vacuum ring 10 which is positioned around the peripheral edges of a laminated glass assembly 12. The individual laminae of the laminated assembly 12 of FIG. 1 are shown in more detail in the cross-sectional view of FIG. 3.

More specifically, the laminated assembly 12 comprises a windshield assembly 14 (which includes individual laminae 14a through 14d) and a single glass cover sheet 16. The windshield assembly 14 includes an outer glass sheet 14a, an inner glass sheet 14b, a plastic interlayer 14c positioned between the glass sheets 14a and 14b, and a second plastic layer 14d positioned on the surface of the inner glass sheet 14b opposite the plastic interlayer 14c. The cover sheet 16 is positioned adjacent the plastic layer 14d and is utilized as a press mold to bond the plastic layer 14d to the inner surface of the glass sheet 14b. The surface of the cover sheet 16 adjacent the plastic layer 14d is generally provided with a suitable wax coating to prevent the layer 14d from bonding to the cover sheet. A more detailed discussion of the laminated assemblies and the methods for producing the same can be found in U.S. Pat. Nos. 3,808,077 and 4,242,403, both of which are herein incorporated by reference.

It will be appreciated that, while the vacuum ring described herein is utilized to produce a laminated windshield assembly of the type shown in FIGS. 3 through 5, the vacuum ring can be utilized to produce, for example, either a conventional laminated windshield having two sheets of glass and a single plastic interlayer, or a single glass sheet window having a plastic layer adhered to one surface thereof. Thus, in its broadest sense, the vacuum ring can be utilized to remove the air spaces located between two individual laminae.

As shown in FIGS. 3 and 4, the vacuum ring 10 is provided with an inwardly facing channel 18 which is adapted to receive the entire peripheral edge of the laminated assembly 12. The ring 10 can be constructed of a flexible material such as silicone, for example. The ring 10 includes a central web 20 having legs 22 and 24 extending outwardly from the web 20 toward the center of the ring. The web 20 is provided with an inner surface 20a in facing relationship to the edges of each of the individual laminae. The leg 22 is provided with an inner surface 22a which is adapted to sealingly engage the outer surface of the glass cover sheet 16, while the leg 24 is provided with an inner surface 24a adapted to sealingly engage the outer surface of the glass sheet 14a. Together, the inner surfaces of the web 20 and the legs 22 and 24 cooperate to define the channel 18.

While the vacuum ring of the present invention can be utilized to de-air a laminated assembly at any point in a laminating operation after the individual laminae have been arranged in a stacked arrangement, the vacuum ring of the present invention is specifically adapted to be utilized during the portion of the laminating operation wherein the laminated glass assembly is heated to cause the individual plastic laminae to bond to the adjacent glass laminae. Typically, such an operation is performed in an autoclave unit of the type shown in U.S. Pat. No. 3,074,466, which is herein incorporated by reference.

The autoclave unit typically includes a chamber for receiving the stacked arrangement of individual laminae having the vacuum ring mounted thereon. The chamber is heated and pressurized to soften the plastic and cause the individual laminae to be urged toward one another. Simultaneously with the heating and pressurizing operation, a vacuum is applied to the spaces between the individual laminae by means of the vacuum ring 10 which is coupled to a vacuum source (not shown) through a conduit 26.

Since the heating and pressurizing operation of the autoclave combined with the evacuation operation typically causes the softened plastic laminae to be forced outwardly past the marignal edge of the associated glass sheets, the vacuum ring of the present invention is designed such that a minimum amount of plastic can escape past the marginal edges of the glass sheets. By reducing the amount of plastic that escapes, any optical distortion which may result around the marginal edges of the laminated glass assembly as a result of the associated plastic layers being of reduced thickness, is minimized.

In the preferred embodiment of the invention, the portion of the vacuum ring which surrounds three sides of the laminated glass assembly, namely portions 10a, 10b and 10c as shown in FIG. 1, is constructed of a configuration similar to the configuration shown in FIG. 3. In FIG. 3, the cross-sectional configuration of the channel 18 defined by the inner surfaces 20a, 22a and 24a substantially conforms to the cross-sectional configuration defined by the outer edge of the laminated glass assembly. Along the fourth side of the laminated glass assembly, namely side 10d as shown in FIG. 1, the vacuum ring is constructed with a configuration as shown in FIG. 4. In FIG. 4, a first recessed portion or groove 28 is formed adjacent the plastic layer 14d along the inner surface 20a of the web 20 the entire length of the fourth side 10d, while a second generally parallel recessed portion or groove 30 is spaced from the groove 28 and is formed adjacent the plastic layer 14c. As shown in FIG. 5, the grooves 28 and 30 communicate with a passageway 26a formed in the flexible conduit 26 which in turn is coupled to an associated vacuum source.

It is important to note that the width of the first and second grooves 28 and 30 are substantially the same as the thickness of the adjacent plastic sheets, while the depth of each groove is substantially equal to its width. It has been found that providing individual grooves adjacent the associated plastic sheet, and minimizing the size of these grooves, reduces the amount of plastic material which can be forced outwardly from the glass sheets. Also, it should be noted that typically the sides 10a, 10b and 10c of the vacuum ring are positioned around the sides and top of the windshield, while the side 10d is positioned along the bottom of the windshield, since the lower edge of the windshield can more readily accommodate any distortion as a result of the plastic layers flowing into the grooves 28 and 30.

As shown in FIG. 2, the groove 28 tapers inwardly as shown at 28a, around the corner of the windshield at the portion where the one end of the side 10d meets the lower end of the side 10a. The opposite end of the groove 28, along with both ends of the second groove 30, can be tapered in a similar manner.

To reduce any flow of plastic material into the passageway 26a of the conduit 26, a sleeve 32 having a screen 32a mounted therein is inserted into the upper end of the conduit 26a, as shown in FIG. 5, for preventing any flow of plastic material into the conduit. It has been found that a 100 mesh stainless steel screen provides satisfactory results. Further, to prevent the conduit 26 from collapsing as a result of the vacuum, a helical spring coil 34 can be positioned within the conduit, as shown in FIG. 5.

Figure 7:
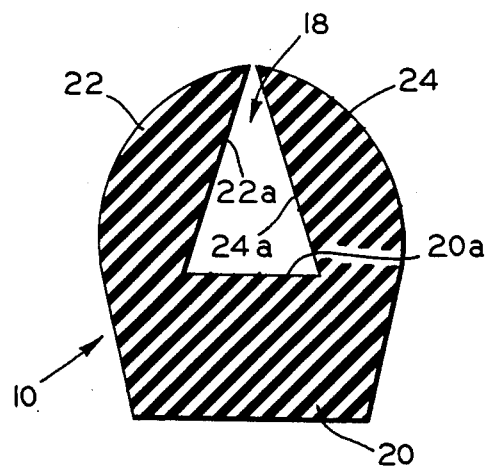
FIG. 7 is a sectional view, similar to FIG. 3, but showing the vacuum ring prior to assembly about the peripheral edge of the laminated assembly.

The cross-sectional view shown in FIG. 7 is similar to FIG. 4, but illustrates the vacuum ring prior to positioning the ring on the laminated glass assembly. It is important to note that the legs 22 and 24 are inclined inwardly toward one another, and must be expanded outwardly prior to placing the ring about the laminated glass assembly. When it is positioned on the glass assembly, the legs 22 and 24 will naturally be urged toward the adjacent glass sheet, thereby insuring an effective seal.

It should be noted that the present invention encompasses the concept of a vacuum ring which can be mounted about the peripheral edges of a laminated glass assembly, and is constructed to minimize any flow of plastic material outwardly from the marginal edges of the glass sheet. While a ring having individual grooves formed around the entire ring with each groove located adjacent a particular plastic sheet to be bonded to an associated glass sheet of a laminated glass assembly has been found effective, it has been found that satisfactory results can also be obtained by forming the grooves only along a portion of the ring, and constructing the remaining portion with a cross-sectional configuration which substantially conforms to the cross-sectional configuration of the peripheral edge of the laminated assembly when the ring is mounted on a laminated assembly and is coupled to an associated vacuum source.

Figure 8:
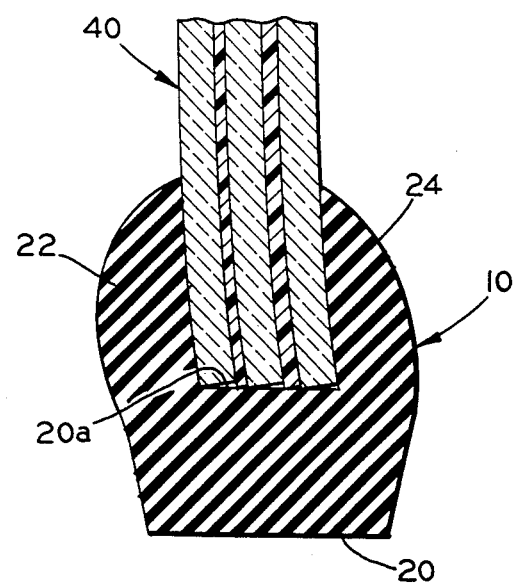
FIG. 8 is a sectional view, similar to FIG. 3, but illustrating the vacuum ring of the present invention positioned about the edge of the laminated assembly wherein the edges of the individual laminae are not flush with one another.

It should be noted that a ring having a cross-sectional configuration as shown in FIG. 3 provides a ring wherein the cross-sectional configuration substantially conforms to the cross-sectional configuration of the peripheral edge of the laminated assembly when the peripheral edges of the individual laminae are substantially flush with one another. However, it will be appreciated that, due to the presence of normal manufacturing tolerances, it is highly unlikely that the edges of the individual laminae will be perfectly flush with one another. For example, as shown in FIG. 8, when curved sheets 40 are assembled in a stacked arrangement, the edge portions of the sheets may not be flush with one another. It is the purpose of the present invention to provide a ring construction which minimizes any areas into which the associated plastic sheet can flow during the laminating operation. It has been found that, over a certain tolerance range, a vacuum ring having a construction as shown in FIGS. 3 and 8 can be utilized to provide satisfactory results. As shown in FIG. 8, the generally flat inner wall 20a of the web 20 abuts the edges of the laminae.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A vacuum ring for use in removing air spaces located between the facing surfaces of at least two laminae of a laminated assembly, said ring adapted to be coupled to a vacuum source and to be mounted about the entire peripheral edge of the laminated assembly, said ring constructed of a flexible material and having a channel formed therein for receiving the peripheral edge of the laminated assembly, said channel defining an inner surface having a cross-sectional configuration which generally conforms to the cross-sectional configuration defined by the outer edge surface of the laminated assembly.

2. A vacuum ring for use in removing air spaces located between the facing surfaces of at least two individual laminae of a laminated assembly, said ring adapted to be coupled to a vacuum source and to be mounted about the entire peripheral edge of the laminated assembly, said ring constructed of a flexible material and having a channel formed therein for receiving the peripheral edge of the laminated assembly, at least a first length of said channel defining an inner surface having a cross-sectional configuration which generally conforms to the cross-sectional configuration defined by the outer edge surface of the laminated assembly when the ring is mounted on the laminated assembly and coupled to the vacuum source, at least a second length of said channel defining an inner surface having a cross-sectional configuration which substantially conforms to the cross-sectional configuration defined by the outer edge surface of the laminated assembly when the ring is mounted on the laminated assembly and coupled to the vacuum source, said second length of said channel provided with a recess which is positioned adjacent the juncture of the edges of the individual laminae when said ring is mounted on the laminated assembly, said recess providing communication between the laminae and said vacuum source along said second length of said channel, said recess defined by a wall at least a portion of which is maintained in spaced apart relationship with the laminated assembly when the ring is coupled to the vacuum source.

3. The vacuum ring according to claim 2 including a flexible conduit for coupling said ring to said vacuum source.

4. The vacuum ring according to claim 3 including spring means positioned within said conduit for preventing said conduit from collapsing when said ring is coupled to said vacuum source.

5. The vacuum ring according to claim 3 including screen means positioned in the one end of said conduit coupled to said ring for preventing said laminae from entering said conduit.

6. The vacuum ring according to claim 3 wherein said ring includes four sides joined together to form a generally rectangular-shaped ring, three of said sides defining said first length and the other one of said sides defining said second length.

7. A vacuum ring for use in removing air spaces located between the facing surfaces of at least two laminae of a laminated assembly, said ring adapted to be coupled to a vacuum source and to be mounted about the entire peripheral edge of the laminated assembly, said ring constructed of a flexible material and including a main web and two spaced apart legs extending outwardly from said web, said web and said legs having an inner surface cooperating to define a channel for receiving the peripheral edge of the laminated assembly, said inner surfaces of said legs sealingly engaging outer surfaces of the laminated assembly, said inner surface of said web being in facing relationship to the edge of the laminated assembly when said ring is mounted on the laminated assembly, at least a first length of said inner surface of said web being generally planar and in abutting relationship with the peripheral edge of the laminated assembly when said ring is mounted on the laminated assembly.

8. The vacuum ring according to claim 7 including a flexible conduit for coupling said ring to said vacuum source.

9. The vacuum ring according to claim 8 including spring means positioned within said conduit for preventing said conduit from collapsing when said ring is coupled to said vacuum source.

10. The vacuum ring according to claim 8 including screen means positioned in the one end of said conduit coupled to said ring for preventing said laminae from entering said conduit.

11. The vacuum ring according to claim 7 wherein at least a second length of said inner surface of said web is substantially planar and in abutting relationship with the peripheral edge of the laminated assembly and is provided with a recess which is positioned adjacent the juncture of the edges of the individual laminae when said ring is mounted on the laminated assembly, said recess providing communication between the laminae and said vacuum source along said second length of said channel, said recess defined by a wall at least a portion of which is maintained in spaced apart relationship with the laminated assembly when the ring is coupled to the vacuum source. adapted 12. An evacuation ring for use in removing air spaces located between the facing surfaces of a laminated assembly including a first, second and third glass sheet and a first plastic sheet located between the first and second glass sheet and a second plastic sheet located between the second and third glass sheet, said ring adapted to be coupled to a vacuum source and to be mounted about the peripheral edge of the laminated assembly, said ring constructed of a flexible material and including a main web and two spaced apart legs extending outwardly from said web, said web and said legs each having an inner surface cooperating to define a channel for receiving the peripheral edge of the laminated assembly, said inner surface of said web being in facing relationship to the edge of the laminated assembly when said ring is mounted on the laminated assembly, said inner surface of said web provided with a first groove extending a predetermined length of said channel and located adjacent the first plastic sheet and a second groove spaced from said first groove and provided in said inner surface of said web and positioned adjacent said second plastic sheet.

13. A vacuum ring for use in removing air spaces located between the facing surfaces of at least two laminae of a laminated assembly, said ring adapted to be coupled to a vacuum source and to be mounted about the peripheral edge of the laminated assembly, said ring constructed of a flexible material and having a channel formed therein for receiving the peripheral edge of the laminated assembly, at least a predetermined length of said channel provided with a recess which is positioned adjacent the juncture of the edges of the individual laminae when said ring is mounted on the laminated assembly, said recess providing communication between the laminae and said vacuum source along said predetermined length of said channel, and a flexible conduit for coupling said ring to said vacuum source, said conduit including a screen means positioned in the one end of said conduit coupled to said ring for preventing said laminae from entering said conduit.

* * * * *